United States Patent [19]

Miller et al.

[11] Patent Number: 4,922,362

[45] Date of Patent: May 1, 1990

[54] METHODS FOR DECONVOLUTION OF UNKNOWN SOURCE SIGNATURES FROM UNKNOWN WAVEFORM DATA

[75] Inventors: Douglas Miller, Newtown; Jakob Haldorsen, Ridgefield, both of Conn.

[73] Assignee: Schlumberger Technology Corporation, New York, N.Y.

[21] Appl. No.: 360,185

[22] Filed: Jun. 1, 1989

Related U.S. Application Data

[63] Continuation-in-part of Ser. No. 164,080, Mar. 4, 1988, abandoned.

[51] Int. Cl.$^5$ ............................................. G01V 1/36
[52] U.S. Cl. .................................... 367/46; 367/38; 367/52; 367/57; 367/58
[58] Field of Search ...................... 367/46, 52, 57, 58, 367/38

[56] References Cited

U.S. PATENT DOCUMENTS

| | | | |
|---|---|---|---|
| 2,452,515 | 10/1948 | Athy | 367/36 |
| 2,569,411 | 9/1951 | Ellis | 367/37 |
| 2,898,084 | 8/1959 | Eckel et al. | 175/1 |
| 3,626,482 | 12/1971 | Quichaud et al. | 175/25 |
| 3,702,635 | 11/1972 | Farr | 186/299 |
| 3,739,871 | 6/1973 | Bailey | 175/1 |
| 3,876,016 | 4/1975 | Stinson | 175/45 |
| 3,979,724 | 9/1976 | Silverman et al. | 181/102 |
| 4,003,017 | 1/1977 | Bailey | 175/45 |
| 4,033,429 | 7/1977 | Farr | 181/106 |
| 4,103,756 | 8/1978 | Trulio et al. | 181/121 |
| 4,207,619 | 6/1980 | Klaveness | 367/36 |
| 4,363,112 | 12/1982 | Widrow | 367/30 |
| 4,365,322 | 12/1982 | Widrow | 367/32 |
| 4,460,059 | 7/1984 | Katz | 181/102 |
| 4,474,250 | 10/1984 | Dardick | 175/1 |
| 4,627,036 | 12/1986 | Wyatt | 367/57 |
| 4,660,184 | 4/1987 | Haukjem et al. | 367/16 |
| 4,688,198 | 8/1987 | Wiggins | 367/46 |
| 4,702,343 | 10/1987 | Paulsson | 181/106 |
| 4,706,223 | 11/1987 | Zimmerman | 367/38 |
| 4,718,048 | 1/1988 | Staron et al. | 367/40 |
| 4,721,180 | 1/1988 | Haughland et al. | 181/111 |
| 4,729,101 | 3/1988 | Hanson et al. | 364/421 |
| 4,752,916 | 6/1988 | Lowen et al. | 367/24 |

FOREIGN PATENT DOCUMENTS

2173596A 10/1986 United Kingdom.

OTHER PUBLICATIONS

D. Miller et al., "A New Slant on Seismic Imaging: Migration and Integral Geometry", Geophysics, vol. 52, No. 7 (Jul. 1987), pp. 943–964.

M. Oristaglio, "A Guide to Current Uses of Vertical Seismic Profiles", Geophysics, vol. 50, No. 12 (Dec. 1985), pp. 2473–2479.

W. Harlan et al., "Signal/Noise Separation and Velocity Estimation", Geophysicst, vol. 49, No. 11 (Nov. 1984), pp. 1869–1880.

"An Intro. to Geophysical Exploration," Kearey et al., Blackwell Sci. Pub., 1984, TN269K37, pp. 79–82.

Primary Examiner—Thomas H. Tarcza
Assistant Examiner—Ian J. Lobo
Attorney, Agent, or Firm—Clifford L. Tager

[57] ABSTRACT

A method for the determination and deconvolution of the signature of an unknown, non-impulsive source signal. The method supposes that that an array of receivers is positioned at the earth's surface to detect and record the seismic signals resulting from the interaction of the source with the earth's subsurface. The traces of data recorded are time-shifted by an amount determined by a coherency analysis of the data. The signal is estimated from the time-shifted data with a weighting factor applied at each trace. A deconvolution filter is determined from the estimate and is weighted at each frequency according to the strength of the source at that frequency. The filter is then applied to the time-shifted data.

21 Claims, 5 Drawing Sheets

METHODS FOR DECONVOLUTION OF UNKNOWN SOURCE SIGNATURES FROM UNKNOWN WAVEFORM DATA

This application is a continuation-in-part application of application Ser. No. 164,080 filed Mar. 4, 1988, now abandoned.

FIELD OF THE INVENTION

This invention relates to methods for processing of waveform data to profile the earth's subsurface structure in the vicinity of a borehole. More specifically, it relates to methods for estimation and removal of the effect of an unknown source signature by coherency analysis and data adaptive deconvolution filtering.

BACKGROUND OF THE INVENTION

Reflection seismology involves profiling subsurface earth formations to aid in resource prospecting. Seismic energy, in the form of acoustic waves, is generated by a source and coupled to the earth such that the waves travel through the subsurface formations. At each interface between different subsurface layers, a part of the incident acoustic wave is reflected towards one or more receivers, where the energy is recorded for subsequent analysis.

The ultimate objective of seismic analysis is to determine the strengths and distribution of reflectors of seismic energy within the earth, such reflectors being intimately related to bedding geometry and differences in material properties. The determination of the distribution of reflecting strength within the earth requires an estimation of the wavefield incident on each reflector, since the reflected wavefield is the result of an interactin of the reflectors with the incident wavefield. This interaction is modeled as the convolution of the reflecting distribution and strengths with the incident wavefield. The sought properties of the reflectors are thus obtained by deconvolving the reflected wavefield by the incident wavefield. If the source is impulsive, the deconvolution is not necessary—if the source has an extended signature, knowledge of the signature enables the reduction to an impulsive signature.

Various configurations of acoustic sources and receivers are used to perform the seismic profiling. In vertical seismic profiling (VSP), the drilling operations are halted while receivers are lowered into the borehole. A source on the surface generates acoustic waves which are recorded at various levels by receivers in the borehole. More recently, VSP has been performed with the positions of the source and receiver reversed. The so-called reverse VSP (RVSP), utilizes an array of receivers at the surface and a downhole source.

New methods in seismic profiling, called measurement while drilling (MWD), are directed towards performing seismic measurements without halting the drilling operations, thereby saving time and operating costs. Attempts have been made to develop sources with controllable characteristics for use in the borehole while drilling. The data acquired using such sources could be processed using existing processing techniques—they would, however, require additional electrical connections in the borehole and must be coupled efficiently to the earth formation to deliver the seismic energy into the subsurface. Both of these requirements may interfere with drilling.

An alternative to using known sources downhole is to use the noise generatred by the drill bit as it is drilling as a source of acoustic waves. This MWD method, however, offers a source with uncontrolled characteristics, the signal depending on the design of the drill, the speed of rotation and on the properties of the material in the borehole. Furthermore, there is no starting time for such a signal, for the drill is continuously rotating. The two main problems with using the drill bit as a seismic source are thus the unknown signature of the drill bit noise and the timing of the data. The timing of the data is related to knowledge of the acoustic velocity of the subsurface formations between the drill bit and the receivers.

SUMMARY OF THE INVENTION

In accordance with the invention there is provided a processing technique, for independent determination and deconvolution of the signature of an unknown, non-impulsive acoustic source signal for seismic profiling, and the velocity of the medium in which the source is embedded. The method supposes that an array of receivers is positioned at the earth's surface to detect and record the seismic signals resulting from the interaction of such non-impulsive source with the earth's subsurface. The seismic signals are recorded as data traces at each receiver in the array.

Moveout corrections, which time-shift the data traces, correct for differences in the arrival times of a wavefront of the direct wave propagating from the source to the receivers in the array. The time-shifts are determined by a coherency analysis of the seismic data, wherein the time difference between the occurrence at adjacent traces of the dominant energy in any single trace, is determined. Since the dominant energy within any single trace is due to direct waves from the source, the moveout corrections synchronize the wavefronts of the direct wave across the receiver array. The non-impulsive source signature is estimated as a weighted average of the signals from each time-shifted trace. The weighing factor to be applied to each single trace is estimated from a priori knowledge of the location of other sources contributing to the seismic energy recorded by the traces.

The velocity of the medium between the source and the receiver arrays, is determined from an analysis of the moveout time-shifts in relation to the geometry of the total ensemble of the source and the receivers. The velocity is used to fix the time reference of the data.

The effect of the extended signature of the non-impulsive source on the seismic signals measured by the receiver array is removed by an inverse amplitude deconvolution filter, obtained from the estimate of the source signature. The filter, in accordance with the invention, is weighted according to an analysis of the seismic data which, at any given frequency, indicates the strength of the unknown source relative to the total strength of the recorded seismic signal.

Once the effect of the acoustic source has been removed by the processing steps in accordance with the invention, standard processing techniques are used to analyze the processed seismic data to create an image of the earth's subsurface.

The present invention describes how the two problems of signature and velocity estimations can be separated and the source signature be reduced to an impulsive signature for any variations of acoustic velocity, provided the drill bit is the strongest subsurface source of acoustic energy.

This invention is particularly useful in seismic profiling when continuously emitting sources are used, in particular noise from the drill bit, but is also useful of other downhole acoustic sources with extended signature. Finally, it can also be applied to waveform data other the seismic data, such as electromagnetic data generated from a downhole source with an extended time signature.

DESCRIPTION OF THE PREFERRED EMBODIMENT

Figure 1:
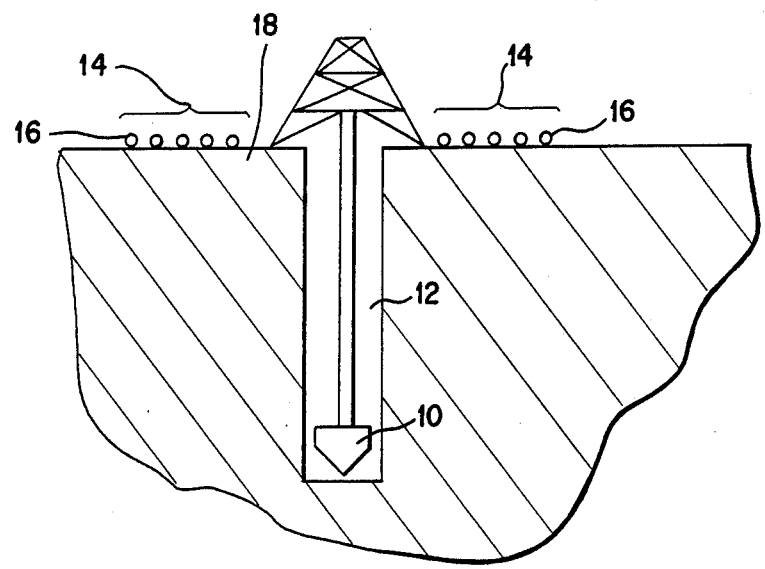
FIG. 1 illustrates a configuration for RVSP using an unknown and non-impulsive acoustic source and an array of receivers.

Referring to FIG. 1 of the drawings, a configuration for the implementation of a reverse VSP (RVSP) technique, using the drill bit 10 as a source of acoustic waves, is shown. The drill bit 10 is inserted into a borehole 12, which transverses the earth formation 18. An array of receivers 14 is positioned on the earth's surface to detect and record acoustic waves resulting from the source, reflected source wavefronts and random noise.

It is the purpose of the seismic method of exploration for resources to use the reflected acoustic energy to extract information about material properties of the subsurface. When a source with extended signature is used, waves travelling directly from the source to the receivers will overlap both in space and in time with energy reflected from different interfaces and arrive at the same time at the receivers 16. In other types of seismic exploration where sources with extended signatures are used, measurements or a priori knowledge of the signature make it possible to reduce the recorded data to data that is similar to what would have been generated by an impulsive source. In doing this, the different wavefronts are separated in time. The technique used to perform this separation is deconvolution.

The drill bit 10 acts as a source of acoustic waves while it is rotating. The signature of the noise generated by the drill bit is, however, unknown and uncontrolled, depending on the design of the bit, on its speed of rotation in the borehole 12 and on the materials in the borehole 12. The periodic motion of the tool generates a signal with a few strong spectral components, and the signature is by the nature of its generation non-impulsive. Hammering of the drill bit 10 against the bottom of the borehole 12 during drilling operations, is a source of energy that widens the frequency spectrum of the drill bit signature. Due to the difficulties involved in having electric wires between the surface and the bottom of the borehole it is not at the present seen feasible to use devices downhole that measures the drill bit noise and transmits these measurements to the surface. This means that the signature of the drill bit noise is not readily available by any standard techniques.

Figure 2:
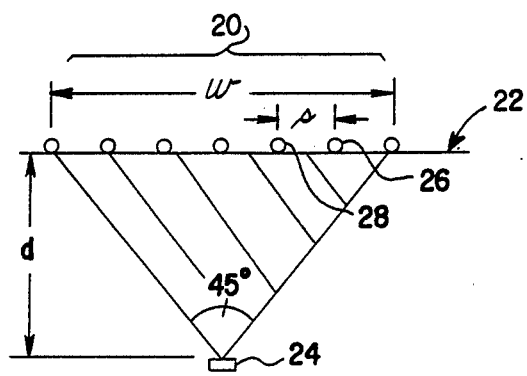
FIG. 2 illustrates the dimension requirements of receiver array in accordance with the processing steps of the present invention.

Referring to FIG. 2 of the drawing, a one dimensional array of receivers 20 is shown lying on the surface of the earth 22. To assure collection of sufficient data, the dimensions of the array 20 must be arranged such that its length, 1, satisfies the relationship:

$$l \geq 2d$$

where d is the distance of the source 24 to the receiver array at a point midway along its length. The dimensions of the array enable focusing of the array to separate the acoustic waves coming directly from the source from reflected waves or waves generated by other acoustic sources.

Additionally, the distance, s, between two adjacent receivers 24 and 26 should satisfy the following relationship:

$$\leq \leq \frac{\lambda}{2}$$

where $\lambda$ is the wavelength of the slowest wave mode. This last requirement avoids spatial aliasing, that would give ambiguities in the determination of the direction of incoming waves. This enables the removal of surface waves by velocity filtering before any other analysis is done. These two requirements put together specify the minimum number of receivers that are needed in acquisition for efficient subsequent processing of the data.

Although a one dimensional array is illustrated in the drawing, a grid or two dimensional array may be utilized, in which case the array should be dimensioned in any direction in accordance with the above requirements.

Figure 3:
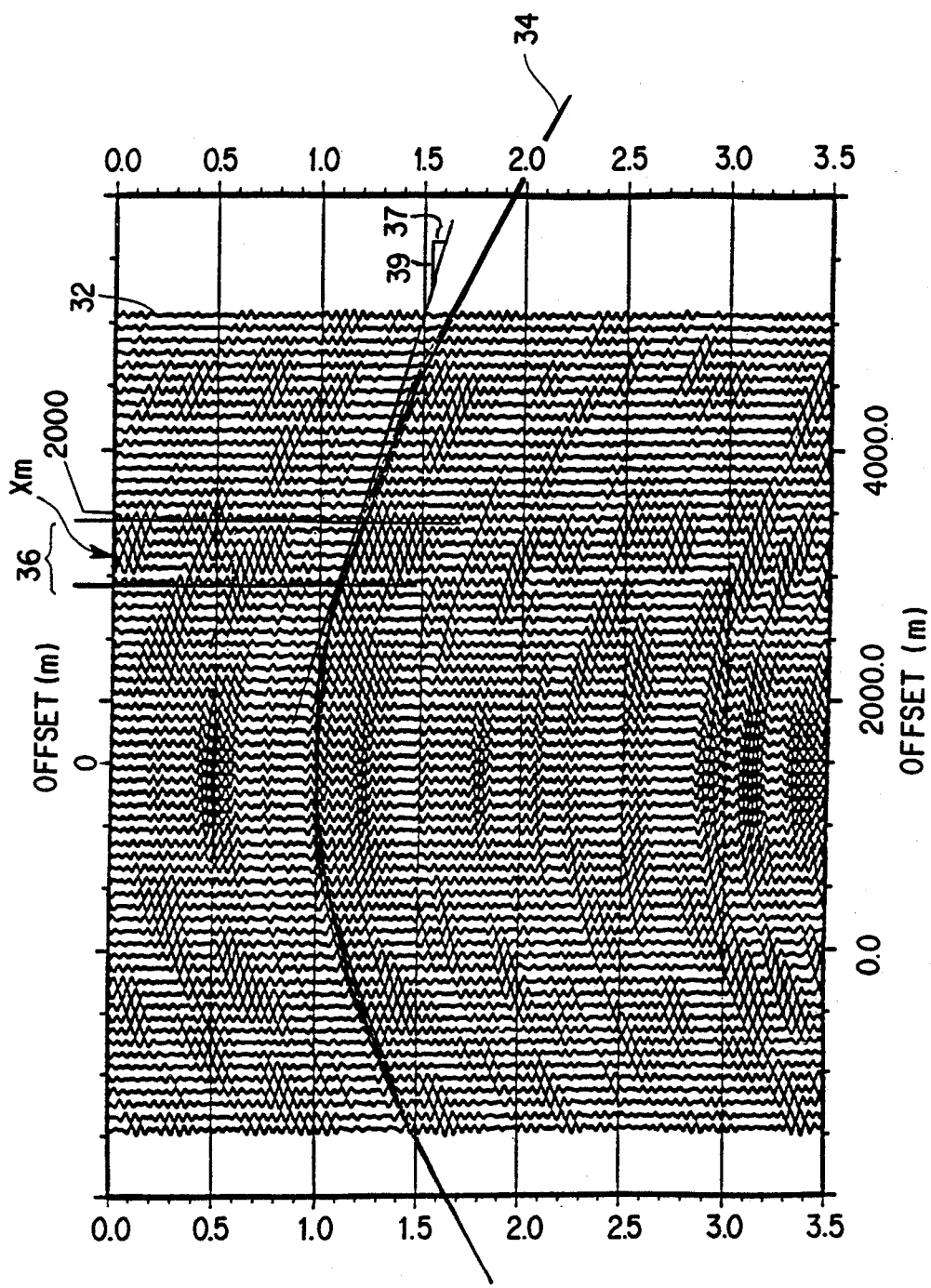
FIG. 3 illustrates traces of acoustic signals recorded at each receiver in an array.

Referring to FIG. 3 of the drawings, the acoustic signals recorded at each receiver 16 in the array 14 as a result of the drill bit 10 rotation, are shown. Each vertical line 32 is called a "trace" and represents the variation with respect to time of the acoustic signal at a receiver 16 which is offset from the source 10 by the distance indicated.

Figure 4:
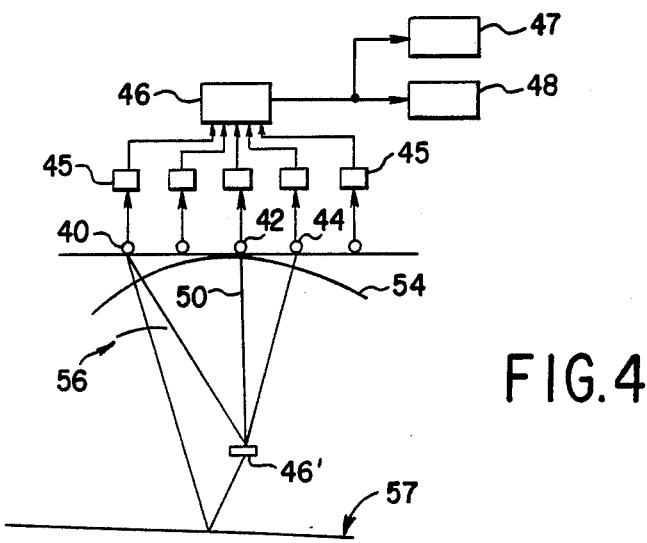
FIG. 4 illustrates the geometry of the RVSP configuration.

FIG. 4 of the drawings illustrates the different arrival times resulting from the geometry relating the position of the receiver array 14 and the drill bit 10 of FIG. 1. Referring to FIG. 4, receivers 40, 42 and 44 are on the earth's surface above source 46, which is directly below receiver 42. As a result, a direct acoustic wavefront from the source 46 will reach receiver 42 before reaching receiver 40 and 44 since the path 50 is shorter than paths 48 or 52. Similarly, the acoustic wave from source 46 will reach receiver 44 before receiver 40 because of the greater offset of receiver 40. The traces 32 associated with receivers 40 and 44 must therefore be time-shifted accordingly, so that the arrival times line up.

The determination of the moveout corrections in accordance with the invention, is done by performing local coherency analysis of the neighboring traces 32. If the direct acoustic wavefront 54 shown in FIG. 4 dominates the energy of the traces 32, i.e. is stronger than the wavefronts 56 reflected by an interface 57 of two different subsurface formation layers and noise from other sources, the coherency analysis enables the determination of the shape of the wavefront 54, and thereby the time-shifts that need to be applied to compensate for the differences in travel time from the source 46 to the individual receivers.

The coherency analysis is implemented in the preferred embodiment by digitizing the analog recordings of the acoustic signals by means of high speed analog to digital converter circuits 45. The digital data is then multiplexed by multiplexer 46 to a standard high speed tape recorder 47 and to a processor 48. For ease of computation, the processor 48 transforms the digitized data from the time domain to the frequency domain by means of a Fourier Transform, so that the trace 32 data are described as a function of offset, x, and frequency, w.

Referring to FIG. 3, the "slope", p, for a number of adjacent traces 36 is defined as the time shift 37, per unit of offset 39. A local slant stack, $S(x_m,w,p)$, over the $2N+1$ traces 36 centered at offset $x_m$, at slope p, and frequency w, is computed such that:

$$S(x_m,w,p) = \sum_{n=m-N}^{m+N} s_n(w)e^{iwp(x_n-x_m)}$$

where $s_n(w)$ is the Fourier transform of the recorded acoustic signals at offset $x_n$ and frequency w and $e^{iwp(x_n-x_m)}$ is the Fourier Transform of an operator that shifts the traces in time according to a constant value of p. The local slant stack, $S(x_m,w,p)$, for each offset, $x_m$, frequency, w, and slope, p, is determined.

The energy of each stack is determined such that $$E(x_m,p) = \sum_w |S(x_m,w,p)|^2$$

In a second embodiment of the invention, a measure of local coherency, $E(x_m,p)$, may be formed from the correlation of recorded acoustic signals from pairs of adjacent traces:

$$E(x_m,p) = \sum_w \bar{s}_m(w)s_{m-1}(w)e^{iwp(x_{M+1}-x_m)}$$

where $\bar{s}_m(w)$ denotes the complex conjugate of $s_m(w)$.

The time shift at a particular offset $x_m$ related to the dominant source is determined by the stack containing the maximum energy at a particular offset. A function, $p(x_m)$, is defined to consist of the $(x_m,p)$-values corresponding to maximum energy $E(x_m,p)$ for each offset $x_m$. The function $p(x_m)$ is integrated to give the moveout, $T_m$, to be applied to each offset:

$$T_m = \sum_{m=1}^{M} p(x_m)(x_{m+1} - x_m)$$

In another embodiment of the present invention, an iterative process is employed which first approximates the dominating moveout and, based on the peak amplitude of the estimated deconvolved data obtained using that approximation, obtains an improved estimate of the dominating moveout.

Specifically, the moveout is preferably approximated by a curve, such as a hyperbola, which depends upon specific geophysical parameters. In the preferred embodiment, a family of moveout curves is defined parameterized by the location of the source relative to the receivers, as well as the velocity of the received waveforms. For example, the following equation represents a moveout curve determined by parameters source depth (z) and average medium velocity (c):

$$t(x) = \frac{z}{c} \sqrt{\left(\frac{x}{z}\right)^2 + 1}$$

where t(x) represents the arrival time, at receiver offset location x, of the waveform given an impulse source. By varying the depth and velocity, a family of curves is obtained. The present invention preferably employs the curve which yields the maximum stacking coherency, relative to the other curves in the family.

Several definitions of stacking coherency are known in the art. In the preferred embodiment, the following equation, representative of stacking coherency as frequency-averaged stack semblance, is employed:

$$E(c,x) = \frac{1}{N} \sum_\omega \frac{\frac{1}{M}\left|\sum_m s_m(\omega)e^{i\omega t(x_m)}\right|^2}{\frac{1}{M}\sum_m |s_m(\omega)|^2}$$

where
N represents the number of frequencies in the Fourier Transform of the received waveforms;
M represents the number of receivers;
$s_m$ represents the waveform at receiver m after Fourier transformation; and
$x_m$ represents offset location x of receiver m.

The curve, representative of an initial estimate of the dominant moveout, has associated therewith time shifts, relative to a reference offset. By applying these time shifts to the received waveforms, a dominating copy of said source signature is approximately aligned. Stacking the time-shifted waveforms yields an initial estimate of the source signature. Deconvolution of the time-shifted waveforms reduces the time-shifted waveforms to an initial estimate of waveforms which would substantially result from the source characterized as an impulse. The dominating moveout is further refined by determining the time at which the peak amplitude occurs in the initial estimate of the dominant moveout.

Once the dominating moveout is obtained, the time shift values associated therewith are applied to the received waveforms, aligning a dominating copy of the source signature. Stacking the time-shifted waveforms yields a more refined estimation of the source signature. This process may be applied yet again, thereby further refining the dominating moveout.

As the data has no absolute reference time, in the preferred embodiment of the invention, the minimum value of all the calculated $T_m$-values is found and subtracted from the $T_m$-values already calculated to give a new set of $T_m$-values. This new set of $T_m$-values are the time delays that are used in the following calculation. The variation of $T_m$ with $x_m$ is illustrated in FIG. 5.

Figure 5:
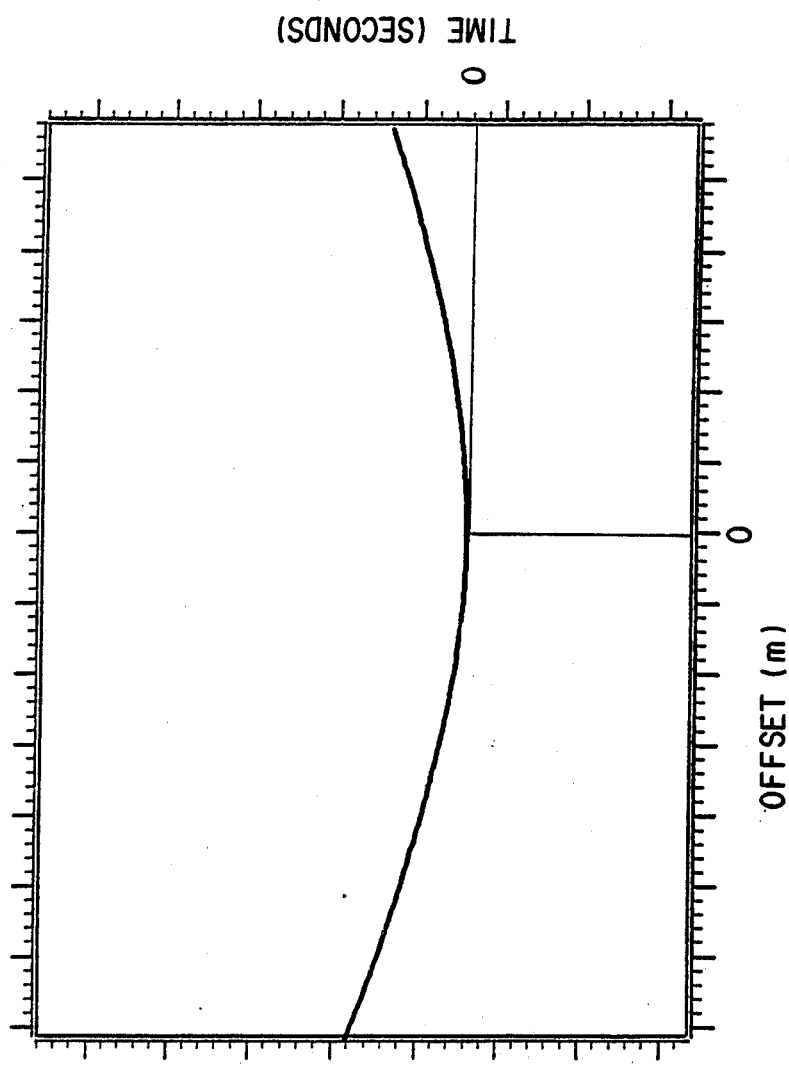
FIG. 5 is the moveout curve that specifies the time-shifts to be applied to each trace of acoustic signals.

To obtain an absolute time reference for the data, the average velocity of the acoustic medium between source and receivers is determined by fitting a hyperbola to the moveout curve of FIG. 5:

$$T_m = (1/c)[(z_m - z_0) + \sqrt{(x_m - x_0)^2 + (z_m - z_0)^2}\,]$$

where c is the average velocity, $x_o$ is the horizontal position, and $z_o$ is the depth of the drill bit 10, and $x_m$ and $z_m$ are the corresponding coordinates of the receivers 16. In the preferred embodiment of the invention, c will be determined from fitting the above expression to the measured values of $T_m$. This fitting is done using standard linear programming techniques, whereas the position of the drill bit, $(x_o, z_o)$ will normally be known. If it is not, that position may also be determined also by standard linear programming techniques.

Figure 6:
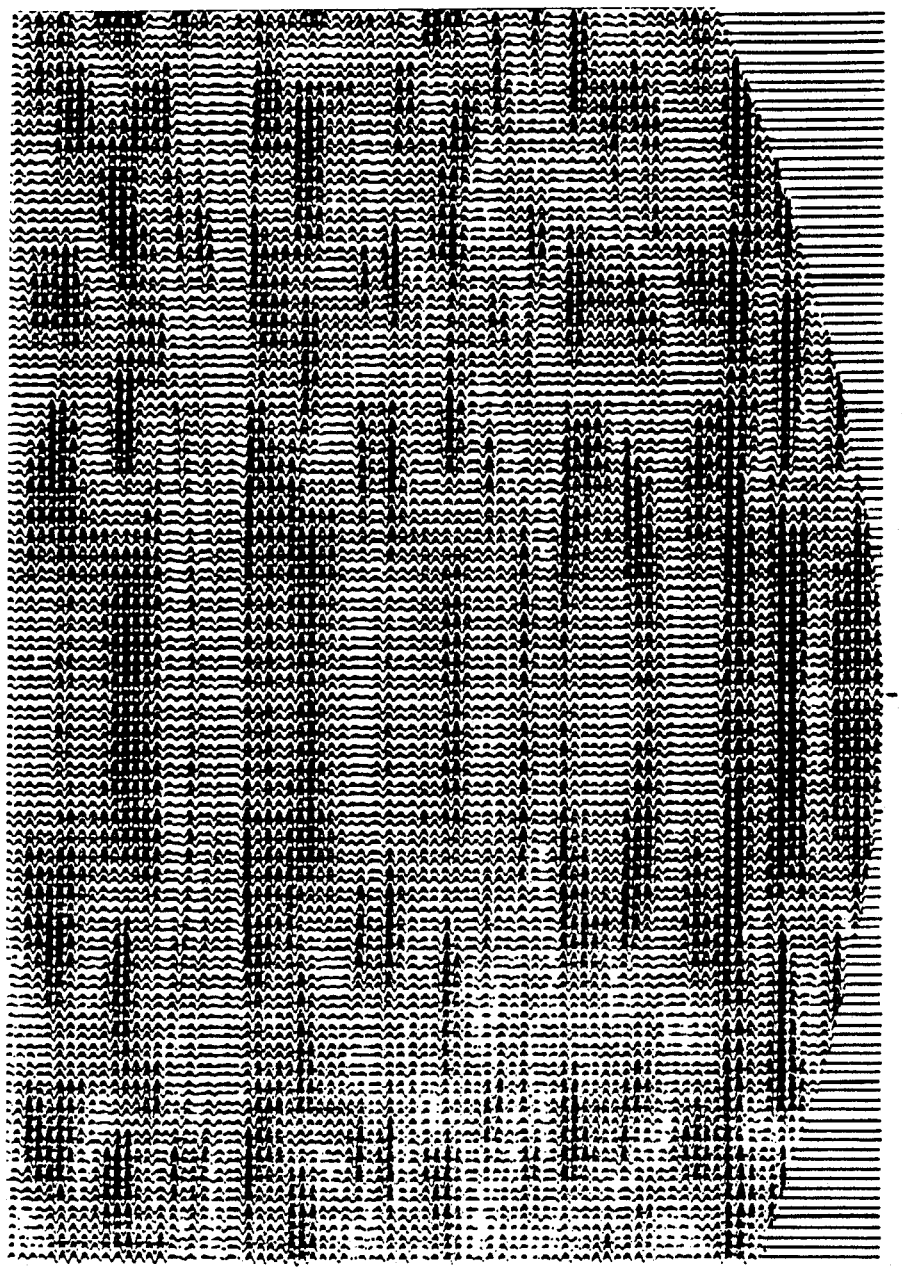
FIG. 6 illustrates the moveout corrected data traces.

The result of applying the time shifts, as determined from the moveout curve in FIG. 5, to the recorded data is shown in FIG. 6. The moveout corrected data represent a family of traces, each containing a copy of the source signature, which has been synchronized across all traces.

The next step in the reduction is to apply a data adaptive deconvolution to reduce the extended signature of the drill bit 10 to an impulsive signature, starting at time $t_m$:

$$t_m = (1/c) \sqrt{(x_m - x_o)^2 + (z_m - z_o)^2}$$

where $t_m$ is the time an acoustic wave needs to travel from the drill bit at position $(x_o, z_o)$ and a receiver at the position $(x_m, z_m)$.

With no a priori information regarding the reliability of the different traces or the spatial distribution of reflectors, or of any other sources of acoustic noise, the best estimate of the signature is the spatial average of the moveout corrected traces:

$$f(t) = \frac{1}{M} \sum_{m=1}^{M} s_m(t + T_m)$$

where $s_m(t+T_m)$ is the moveout corrected version of the trace measured at the offset $x_m$, and M is the total number of traces.

If information is available about strong sources of noise other than the drill bit, or about strong reflectors, weights $w_m$ can be introduced into the estimation of $f(t)$ to reduce the relative importance of the traces measured at offsets $x_m$ where the wavefronts of energy coming from the drill bit 10 and wavefronts from other sources are tangent to each other, so that:

$$f(t) = \left[ \frac{1}{\sum_{m}^{M} W_m} \right] \sum_{m=1}^{M} w_m s_m(t + T_m)$$

For instance, if a strong horizontal reflector is known to be located close to the drill bit, at some greater depth, the traces with the smallest difference in moveout would be the ones with small offsets from the source. Those traces would, therefore, be given weights $w_m$ as follows:

$$w_m = \begin{cases} 0, & \text{for } x_m - x_o < (z_m - z_o) \cdot \tan 15 \\ 1, & \text{otherwise} \end{cases}$$

Other weighing schemes are possible. If no a priori knowledge is available, all the weights $w_m$ would be set to 1.

Taking the Fourier Transform of $f(t)$ converts the estimate to the frequency domain, so that:

$$f(w) = \left[ \frac{1}{\sum_{m=1}^{M} w_m} \right] \sum_{m=1}^{M} w_m s_m(w) e^{-iwT_m}$$

From this estimate of the source signature in the frequency domain, the standard deconvolution filter may be designed by taking the inverse amplitude at each frequency and multiplying by the desired impulsive signature $D(w)$:

$$F'(w) = \frac{\overline{f(w)}}{|f(w)|^2} \cdot (D(w))$$

where $\overline{f(w)}$ is the complex conjugate of $f(w)$, and $$\frac{\overline{f(w)}}{|f(w)|^2}$$

is the inverse amplitude of $f(w)$.

To account for the traveltime, $t_m = (1/c)\sqrt{(x_m - x_o)^2 + (z_m - z_o)^2}$, of an acoustic wave between the drill bit at position $(x_o, z_o)$ and a receiver at position $(x_m, z_m)$, the desired wavelet is set to $$D(w) = e^{-iwt_m}$$

so that the desired wavelet is a time-shifted impulse.

The signature $f(t)$ is the signature of a grinding drill bit. The signature $f(t)$ and filer $F''(w)$, are, therefore highly frequency dependent. The deconvolution filter, therefore, in accordance with the present invention, includes a weighing based on the reliability of the different frequency amplitudes of the estimated signal.

The weighing factor, in the preferred embodiment of the invention, is obtained by taking the ratio of the energy of the average trace:

$$U_e(w) = \left| \left[ \frac{1}{\sum_{m=1}^{M} w_m} \right] \sum_{m=1}^{M} w \, s_m(w) e^{-iwT_m} \right|^2$$

to the average energy of the traces:

$$V_e(w) = \left[ \frac{1}{\sum_{m=1}^{M} w_m} \right] \sum_{m=1}^{M} w_m |s_m(w)|^2$$

The deconvolution filter then becomes:

$$F(w) = \frac{\overline{f(w)}}{|f(w)|^2} \frac{U_e(w)}{V_e(w)} D(w)$$

Figure 7:
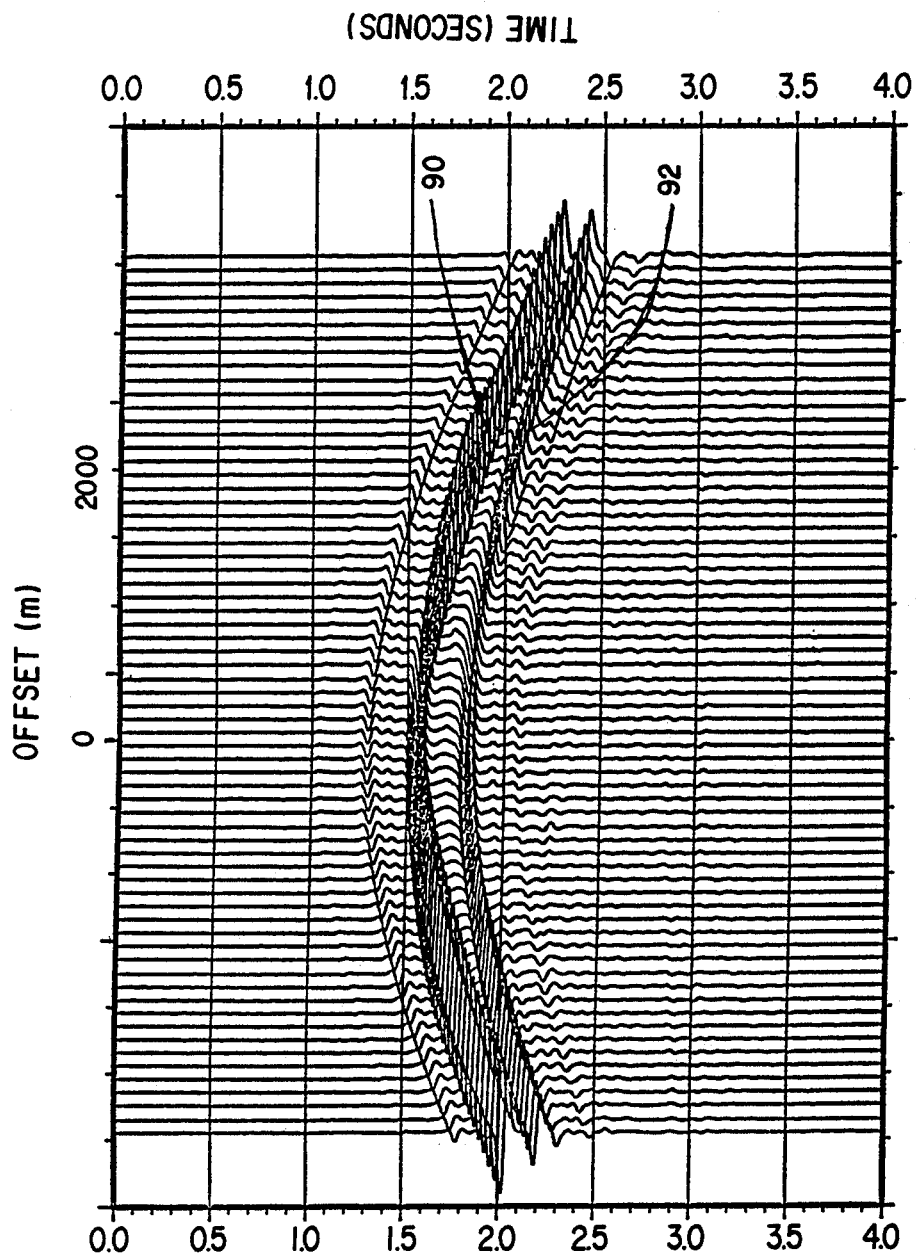
FIG. 7 illustrates moveout corrected data after application of a deconvolution filter.

Applying the filter $F(w)$ to the moveout corrected data shown in FIG. 6 will transform the data into a dataset similar to a dataset that would have been collected if an impulsive source were used at the position of the drill bit, and the directly travelling and reflected waves were recorded at the offsets $z_m$. The result of applying the filter to moveout corrected data is illustrated in FIG. 7, wherein the source signature 90 is reduced to an impulsive type source and the data from reflections 92 is reduced to that which would result from an impulsive source.

This data can now be processed using standard processing techniques, such as common depth point (CDP) or migration.

We claim:

1. In a process for obtaining a vertical seismic profile from seismic data obtained from a source located in a borehole and a plurality of receivers located above the source, the source having an unknown, time-extended signature, a method of estimating said source signature, said method comprising the steps of:

activating the source so as to produce said source signature;

receiving, at the plurality of receivers, seismic waveforms generated as a result of said source signature;

calculating a dominating moveout of said received seismic waveforms based on local coherency analysis;

calculating a time-shift value for each received waveform based on said calculated moveout;

applying said time-shift values to said received waveforms, thereby aligning a dominating copy of said source signature; and stacking said time-shifted waveforms, thereby producing an estimation of said source signature.

2. The method of claim 1, said method further comprising the step of:

deconvolving said time-shifted waveforms, thereby reducing said time-shifted waveforms to waveforms which would substantially result from said source characterized as an impulse.

3. The method of claim 2, wherein the step of deconvolving said time-shifted waveforms comprises the step of:

obtaining a deconvolution function based on dividing the complex conjugate of said estimated source signature at a given frequency by the amplitude squared of said estimated source signature at the given frequency; and applying said deconvolution function to said time-shifted waveforms.

4. The method of claim 3, wherein the step of obtaining said deconvolution function further includes the steps of:

calculating the energy of the estimated source signature at the given frequency;

calculating the average energy of the received waveforms at the given frequency; and multiplying said quotient by the ratio of said energy of the estimated source signature to said average energy of the received waveforms; and multiplying said product by a factor related to said time-shift values.

5. The method of claim 4, said method further comprising the step of:

multiplying said estimated source signature by said deconvolution function, thereby characterizing said estimated source signature as an impulse.

6. The method of claim 1, said method further comprising the step of:

deconvolving said received waveforms, thereby reducing said received waveforms to waveforms which would substantially result from said source characterized as an impulse.

7. The method of claim 6, wherein the step of deconvolving said received waveforms comprises the step of:

obtaining a deconvolution function based on dividing the complex conjugate of said estimated source signature at a given frequency by the amplitude squared of said estimated source signature at the given frequency; and applying said deconvolution function to said received waveforms.

8. The method of claim 7, wherein the step of obtaining said deconvolution function further includes the steps of:

calculating the energy of the estimated source signature at the given frequency;

calculating the average energy of the received waveforms at the given frequency; and multiplying said quotient by the ratio of said energy of the estimated source signature to said average energy of the received waveforms.

9. The method of claim 8, said method further comprising the step of:

multiplying said estimated source signature by said deconvolution function, thereby characterizing said estimated source signature as an impulse.

10. The method of claim 1, wherein the step of calculating the moveout of the received seismic waveforms comprises the steps of:

calculating a local slant stack for each received waveform;

calculating a local energy content for each local slant stack; and calculating said moveout based on the calculated local energy content.

11. The method of claim 1, wherein the step of calculating said moveout of said received seismic waveforms comprises the steps of:

calculating the cross-correlation between adjacent received waveforms; and calculating said moveout based on the calculated cross-correlation.

12. The method of claim 1, wherein the step of stacking said time-shifted waveforms comprises the steps of:

weighting said time-shifted waveforms; and stacking said weighted time-shifted waveforms.

13. The method of claim 12, wherein the step of weighting said time-shifted waveforms comprises the step of:

weighting each of said time-shifted waveforms by a factor related to an expected difference in moveout between wavefronts from direct arrivals and wavefronts due to subsurface reflections.

14. The method of claim 13, wherein said factor is $w_m$, wherein $$w_m = \begin{cases} 0, \text{ for } (x_m - x_0) < (z_m - z_0) \cdot \tan 15 \\ 1, \text{ otherwise.} \end{cases}$$

wherein ($x_O$, $z_O$) represents the horizontal and vertical position, respectively, of the source; and ($x_m$, $z_m$) represents the horizontal and vertical position, respectively, of the receiver corresponding to its respective time-shifted waveforms.

15. The method of claim 1, wherein said source includes noise emanating from a drill bit while the drill bit is in operation in the borehole.

16. The method of claim 1, wherein the steps of calculating the moveout of the received seismic waveforms and calculating a time-shift value for each received waveform comprises the steps of:

determining a time-shift curve from a family of time-shift curves such that the stacking coherency along said determined curve is maximum, relative to the other curves in said family of curves;

applying said time shifts associated with said determined curve to said received waveforms, thereby approximately aligning a dominating copy of said source signature;

stacking said time-shifted waveforms, thereby producing an initial estimation of said source signature;

deconvolving said time-shifted waveforms, thereby reducing said time-shifted waveforms to an initial estimate of waveforms which would substantially result from said source characterized as an impulse;

determining, at each offset, the time at which the peak amplitude occurs in said initial estimate, thereby obtaining an improved estimate of the time-shift curve associated with said dominating moveout; and calculating a time-shift value for each received waveform based on said improved estimate of the time-shift curve.

17. The method of claim 16, wherein said family of time-shift curves are a function of depth and velocity.

18. The method of claim 17, wherein said family of time-shift curves are based on the following equation:

$$t(x) = \frac{z}{c} \sqrt{\left(\frac{x}{z}\right)^2 + 1}$$

where
z represents depth;
c represents velocity;
t(x) represents the curve; and
x represents the receiver offset location.

19. The method of claim 16, wherein, in said step of determining a time-shift curve from a family of time-shift curves, said stacking coherency is based on the following stacking equation:

$$E(c,x) = \frac{1}{N} \sum_{\omega} \frac{\frac{1}{M} \left| \sum_m s_m(\omega) e^{i\omega t(x_m)} \right|^2}{\frac{1}{M} \sum_m |s_m(\omega)|^2}$$

where
N represents the number of frequencies in the Fourier Transform of said received waveforms;
M represents the number of receivers;
$s_m$ represents the waveform at receiver m after Fourier transformation; and
$x_m$ represents offset location x of receiver m.

20. In a method of deconvolving waveforms of seismic data obtained from a source located in a borehole and a plurality of receivers located above the source, the source having a time-extended signature, the method of obtaining a deconvolution function therefor, said method comprising the steps of:

dividing the complex conjugate of said source signature at a given frequency by the amplitude squared of said source signature at a given frequency;

calculating the energy of the source signature at the given frequency;

calculating the average energy of the seismic waveforms at the given frequency; and multiplying said quotient by the ratio of said energy of the source signature to said average energy of the seismic waveforms, thereby obtaining said deconvolution function.

21. The method of claim 20, said method further comprising the steps of:

calculating a dominating moveout of said seismic waveforms;

calculating a time-shift value for each seismic waveform based on said calculated moveout; and multiplying said deconvolution function by a factor related to said time-shift values.

* * * * *

UNITED STATES PATENT AND TRADEMARK OFFICE
CERTIFICATE OF CORRECTION

PATENT NO. : 4,922,362
DATED : May 1, 1990
INVENTOR(S) : Douglas Miller, Jakob Haldorsen, Clement Kostov It is certified that error appears in the above-identified patent and that said Letters Patent is hereby corrected as shown below:

Front page, [75] Inventors should read:

Douglas Miller, Newtown, Connecticut;

Jacob Haldorsen, Ridgefield, Connecticut; and

Clement Kostov, Stanford, California

Signed and Sealed this

Sixteenth Day of July, 1991

*Attest:*

HARRY F. MANBECK, JR.

*Attesting Officer*      *Commissioner of Patents and Trademarks*